United States Patent [19]
Okada

[11] Patent Number: 6,021,153
[45] Date of Patent: Feb. 1, 2000

[54] VARIABLE-CURVATURE REFLECTING MIRROR

[75] Inventor: Takeshi Okada, Osaka, Japan

[73] Assignee: Sumitomo Electric Industries, Ltd., Osaka, Japan

[21] Appl. No.: 09/260,593

[22] Filed: Mar. 2, 1999

[30] Foreign Application Priority Data

Mar. 12, 1998 [JP] Japan .................................. 10-061484

[51] Int. Cl.[7] ...................................................... H01S 3/08
[52] U.S. Cl. ............................ 372/99; 372/107; 372/108
[58] Field of Search .............................. 372/99, 107, 108

[56] References Cited

U.S. PATENT DOCUMENTS

| | | | |
|---|---|---|---|
| H000461 | 4/1988 | Wert, III | 372/99 |
| 3,478,608 | 11/1969 | Met | 372/107 |
| 3,575,669 | 4/1971 | Hoeff | 372/99 |
| 3,601,476 | 8/1971 | Mackenzie | 372/107 |
| 3,814,507 | 6/1974 | Osborn et al. | 372/107 |
| 4,021,754 | 5/1977 | Colao | 372/107 |
| 4,187,475 | 2/1980 | Wieder | 372/107 |
| 4,268,799 | 5/1981 | McCirckerd | 372/107 |
| 4,278,324 | 7/1981 | Zipfel | 372/107 |
| 4,638,486 | 1/1987 | Dost et al. | 372/107 |
| 4,653,063 | 3/1987 | Acharekare et al. | 372/107 |
| 4,777,639 | 10/1988 | Whitrehouse | 372/107 |

FOREIGN PATENT DOCUMENTS

| | | |
|---|---|---|
| 2-321779 | 9/1990 | Japan . |
| 8-39282 | 2/1996 | Japan . |
| 9-293915 | 11/1997 | Japan . |

*Primary Examiner*—Leon Scott, Jr.
*Attorney, Agent, or Firm*—McDermott, Will & Emery

[57] ABSTRACT

A variable-curvature mirror for a laser which makes it possible to obtain a high-accuracy spherical surface by uniformly deforming a reflecting mirror under a low load without stroke loss of an actuator. A top lid has a restricting surface for receiving the peripheral portion of the reflecting mirror to prevent translational movement of the reflecting mirror in the pressurizing direction. A gap is formed to permit pivotal motion of the peripheral portion of the reflecting mirror about the contact point with the top lid. Its thickness is radially changed so that its thickness reduces toward the peripheral portion. The reflecting mirror can thus be smoothly and uniformly deformed.

5 Claims, 3 Drawing Sheets

VARIABLE-CURVATURE REFLECTING MIRROR

BACKGROUND OF THE INVENTION

This invention relates to a reflecting mirror having a variable-shape reflecting surface, and more particularly a variable-curvature reflecting mirror for a laser having a variable-curvature, spherical reflecting surface. This variable-curvature reflecting mirror is especially suitable as a beam propagating reflecting mirror for a laser machining device and as a reflecting mirror for use in an oscillator. By controlling the curvature of the mirror, it is possible to adjust the beam diameter at the final beam focusing point, focal point and the beam mode.

A conventional reflecting mirror having a variable-shape reflecting surface is introduced in a publication by SPIE (The Society of Photo-optical Instrumentation Engineers), vol 1543, on page 36. This is a technique concerning a reflecting mirror of an astronomical telescope. The variable-shape mirror compensates for any turbulence of wavefronts of the incoming beam. In this case, the reflecting surface is deformed to create a desired shape.

In contrast, in a variable-curvature reflecting mirror which is used as a beam propagating reflecting mirror for a laser machining device and a reflecting mirror for use in an oscillator in recent years, the curvature of the spherical mirror is simply controlled instead of creating a desired shape. This variable-curvature mirror is simple, compact and cheap compared with the variable-shape mirror.

In a variable-curvature mirror to which this invention relates, means for deforming the reflecting mirror under pressure include the type in which static pressure is applied to a wide area of the back of the reflecting mirror (unexamined Japanese patent publication 2-231779) and the type in which pressure is directly applied to a limited area of the back of the mirror by e.g. an actuator (direct pressure herein used includes a force transmitted through several fixed parts). This invention is applicable to either type, but for high-accuracy deformation control, the direct-pressure type is preferable to the static pressure type (because in the latter type, it is difficult to seal a static-pressure-producing, liquid pressure medium in a chamber formed in the back of the reflecting mirror for a long time without leakage). The following description is therefore made for the direct-pressure type.

Conventional, direct-pressure type, curvature-variable mirrors are disclosed in e.g. unexamined Japanese patent publications 8-39282 and 9-293915.

The most important characteristics required for a reflecting mirror for use in a laser is the shape accuracy of the reflecting mirror (that is, a deviation from an ideal plane in the case of a plane mirror, and a deviation from an ideal sphere in the case of a spherical mirror). If there is a deviation of 1 $\mu$m or over in the shape of the reflecting surface, wavefronts of the reflected beam tend to be distorted, and thus the beam condensability tends to drop. This makes impossible high-intensity condensation, which is the main feature of laser beams. Thus, it is necessary to reduce a deviation in shape to less than 1 $\mu$m, ideally to less than 0.5 $\mu$m.

In order to achieve such high shape accuracy of a variable-curvature mirror over the entire curvature range, the following three requirements have to be met.

a) Original shape accuracy of the reflecting surface is not worsened but maintained when the curvature is changed.

b) The reflecting mirror support member does not contribute to the worsening of the shape accuracy of the reflecting mirror.

c) The reflecting mirror is less susceptible to such damage as scratches and permanent deformation.

None of conventional mirrors meet all these requirements. For example, unexamined Japanese patent publication 8-39282 discloses a technique in which the thickness of the reflecting mirror is changed, i.e. reduced toward the outer edge to increase the sphere-maintainable range and thus to satisfy the requirement a). In the technique of this publication, the reflecting mirror is bent by resiliently deforming the boundary portion with an outer cylindrical portion with the reflecting mirror completely fixed, so that a large deformation pressure is required and it is difficult to deform the mirror to an ideal shape up to its outer peripheral portion. Also, the reflecting mirror tends to be fatigued with time at its support point of deformation.

On the other hand, in unexamined Japanese patent publication 9-293915, for easy deformation to the outer peripheral portion, the reflecting mirror has its outer edge in line contact so that no restriction to pivotal movement occurs when deformed. But since the mirror is pressed by O-rings from both sides to prevent restriction to pivotal movement at the outer peripheral portion, the reflecting mirror tends to translate in the direction of pressure application. This results in the loss of stroke of the actuator.

An object of this invention is to maintain high shape accuracy by deforming the reflecting mirror under a low load while preventing stroke loss of the actuator.

SUMMARY OF THE INVENTION

According to this invention, there is provided a variable-curvature mirror for a laser comprising a plate-shaped reflecting mirror, a ring-shaped support member for supporting the peripheral portion of the reflecting mirror, and pressurizing means for applying controlled pressure to the back of the reflecting mirror at its central portion to deform the reflecting mirror to form a spherical reflecting surface having a desired curvature, characterized in that the support member has a restricting surface in contact with the reflecting mirror for restricting translation of the reflecting mirror in the direction in which pressure is applied, that the reflecting mirror is supported by the support member with a play to permit pivotal motion of the peripheral portion of the reflecting mirror about a contact point with the support member, and that the thickness of the reflecting mirror radially changes continuously so that in the back thereof, its central portion is thick and the peripheral portion is thinner.

Because the restricting surface on the support member prevents translation of the reflecting mirror, there is no loss in the stroke of the actuator. Because the peripheral portion of the mirror can pivot freely around the support point when pressure is applied by the actuator, the reflecting mirror can be deformed under low load as far as its outer periphery.

Due to the fact that the reflecting mirror is made thick at its center where pressure is applied and gradually thinner toward the peripheral portion, the reflecting surface can be brought to an ideal spherical shape with the curvature stably controlled. However accurately the reflecting surface of the mirror is finished (to a deviation from the ideal surface of 1 $\mu$m or less), if the restricting surface of the support member has a poor flatness, this badly affects the shape accuracy of the reflecting surface. Bringing the flatness of the restricting surface to 1 $\mu$m or less will eliminate such problem.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENT

Figure 1:
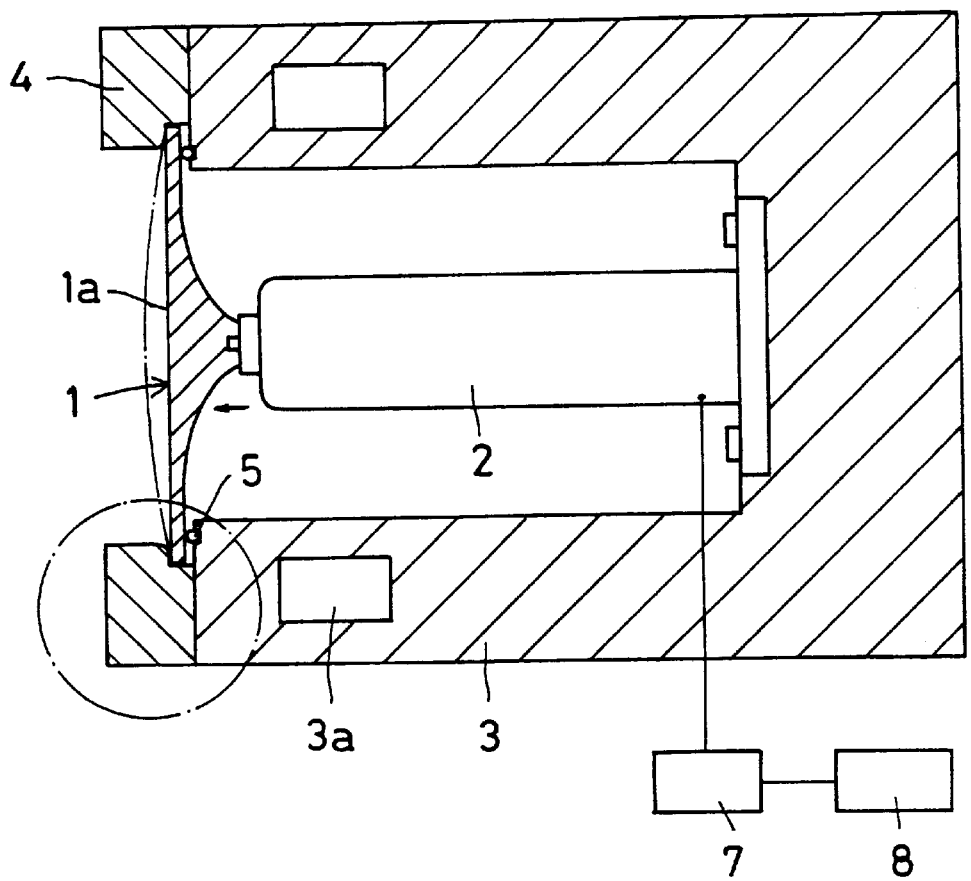
FIG. 1 is a sectional view of a variable-curvature mirror for a laser-embodying this invention.

FIG. 1 shows a variable-curvature mirror embodying this invention. This mirror comprises a reflecting mirror 1, an actuator 2 for applying pressure to the back of the reflecting mirror 1 at its central portion, a water-cooled jacket 3 having a cooling passage 3a, a ring-shaped top cover 4 mounted on the top end of the jacket 3, and an O-ring 5 supporting the reflecting mirror 1 from the back.

The variable-curvature mirror has a top opening (which is the hole of the top cover 4) having a diameter of 62 mm. Its maximum diameter is 100 mm and its maximum length is 132 mm.

The reflecting mirror 1 is made of copper because copper cools quickly and thus is advantageous as a material for a reflecting mirror for use in a high-power laser. Another reason why copper is preferred is because copper is soft and thus is suitable as a material for a variable-curvature mirror, which has to be deformable. The actuator 2 is provided behind the reflecting mirror at its central portion to bear a reaction force from the water-cooled jacket 3.

The actuator 2 is a PZT (Pb (Zr, Ti)$O_3$ piezoelectric elements) actuator and is connected to a control power source 8 through an amplifier 7. The PZT actuator 2 has a stack of layers of PZT (a kind of piezoelectric ceramic) accommodated in a stainless case, and extends at a rate determined by the applied voltage.

As the PZT actuator 2 extends, it applies a pressure against the back of the reflecting mirror 1 at its center, thus deforming the mirror and changing the curvature of its reflecting surface 1a. If the actuator extends by 30 μm from the state where the curvature of the reflecting surface 1a is zero, the reflecting surface 1a is convexed to the curvature of 20 meters.

Figure 3:
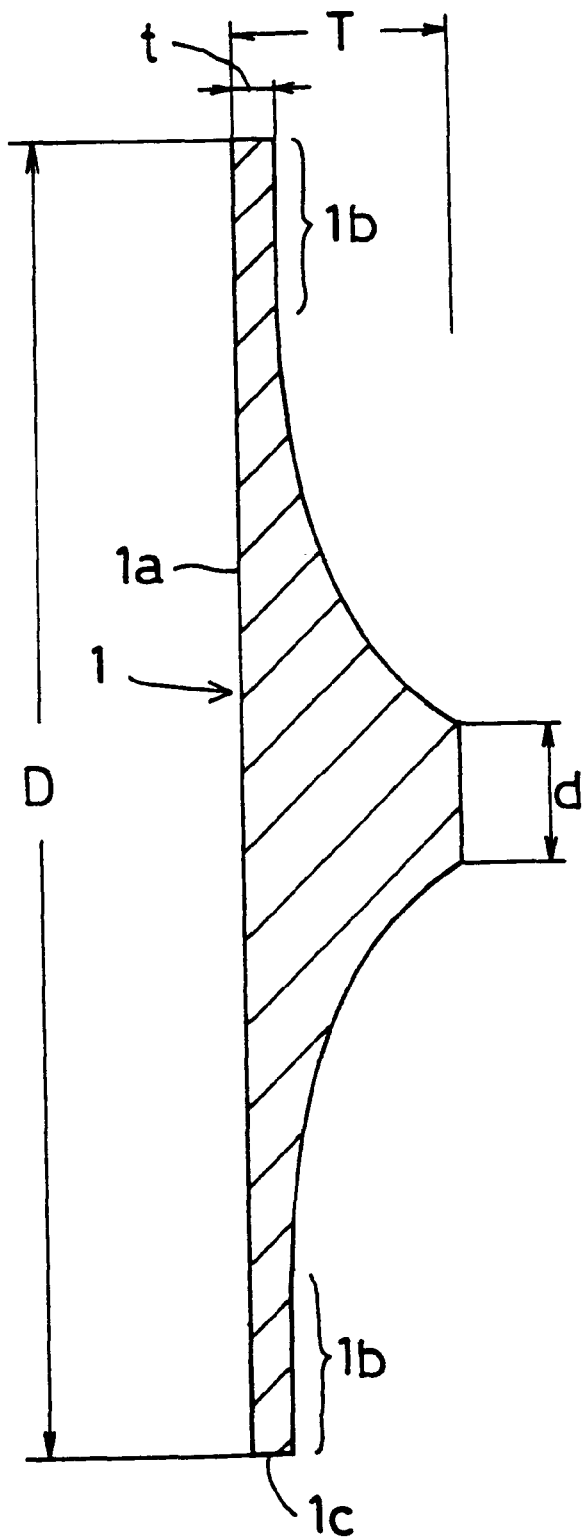
FIG. 3 is a sectional view of the reflecting mirror.

FIG. 3 shows dimensional data of the reflecting mirror 1. As shown, the mirror 1 has an external diameter D=68 mm, a boss diameter d=7 mm, a maximum thickness T=11 mm, and a minimum thickness t=2 mm. At its back, the mirror 1 is contoured such that its thickness gradually and continuously decreases radially from the central boss portion to a flat peripheral portion 1b having a width of about 9 mm.

Figure 4:
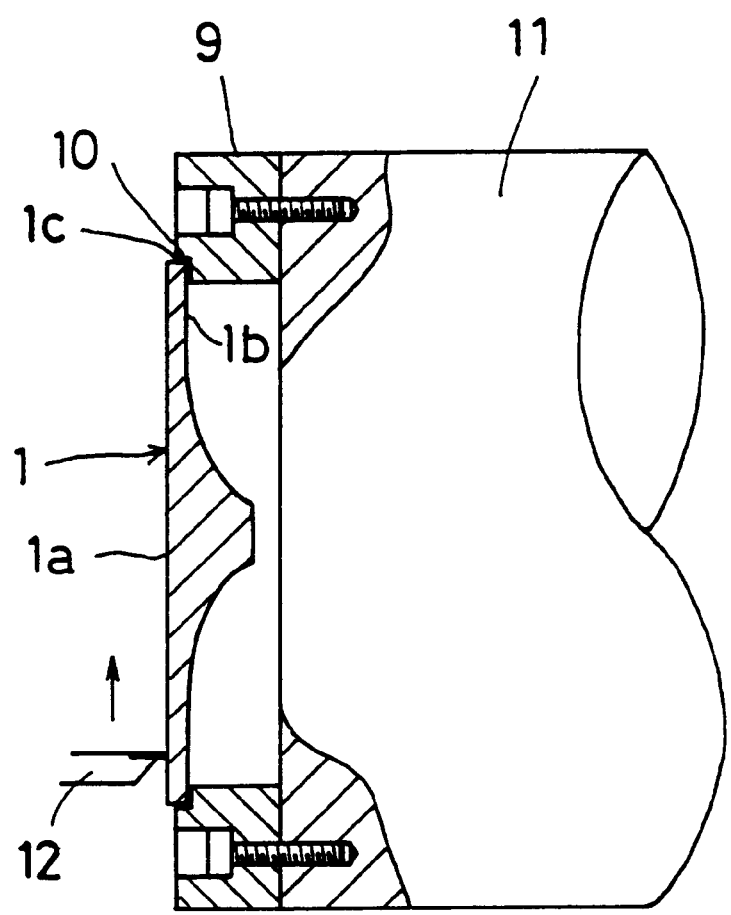
FIG. 4 schematically shows how a mirror surface is formed on a reflecting mirror by use of an ultraprecision lathe.

As shown in FIG. 4, the reflecting surface 1a is mirror-finished by a diamond cutting tool with its outer peripheral portion (flat portion 1b and outer end face 1c) bonded by wax 10 to a machining jig 9 mounted on a spindle 11 of an ultraprecision lathe. The reflecting mirror 1 may be fixed to the spindle 11 by means of a vacuum chuck instead of wax.

The reflecting surface 1a was finished to the flatness of 0.3 μm and the surface roughness Ra=0.005 μm by the ultraprecision lathe. To increase the laser beam reflectance, after mirror-finishing, a gold coating (not shown) having a 99% reflectance was formed on the thus finished reflecting surface by DC sputtering. Instead of gold coating, a reflectance-increasing coat such as a dielectric multi-layer coat may be provided. The dielectric multi-layer coat can be formed by vacuum deposition.

Figure 2:
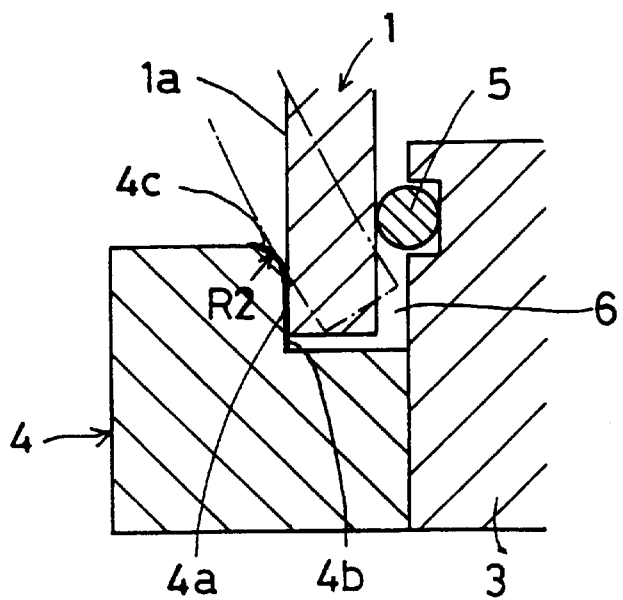
FIG. 2 is an enlarged sectional view of a portion of FIG. 1 enclosed in the circle.

The edge of the reflecting mirror 1 is supported by the top cover 4, part of the water-cooled jacket 3 and the O-ring 5. As shown in FIG. 2, the reflecting mirror 1 has an outer peripheral portion of its reflecting surface 1a (portion having a diameter larger than 64 mm) in contact with an annular restricting surface 4a of the top cover 4. A gap 6 is provided between the back of the outer peripheral portion of the mirror 1 and the top end of the water-cooled jacket 3. In order to stably hold the outer peripheral portion of the mirror, this portion is resiliently pressed against the restricting surface 4a of the top cover 4 by the O-ring 5 (which may be replaced with an annular cushion sheet).

With this arrangement, when the actuator 2 extends, the translation of the mirror 1 in the direction in which the actuator 2 extends is prevented by the top cover 4, but the pivotal motion of the outer peripheral portion of the mirror around the contact point with the restricting surface 4a is allowed without undue resistance to deformation at the outer peripheral portion. Also, the mirror 1 is deformed not only at it central pressure-receiving area but over the entire area including the outer edge as shown by chain line in FIG. 2.

The top cover 4 is made of duralumin, a material which is easy to machine and strong. In order to prevent the influence of the restricting surface 4a in contact with the reflecting mirror 1 on the shape accuracy of the reflecting surface, it was cut to a high-accuracy surface having a flatness of about 0.2 μm with a diamond cutting tool using an ultraprecision lathe as with the reflecting surface 1a.

A coating of hardened fluororesin film 4b (see FIG. 2) was formed on the restricting surface 4a. At the inner corner of the restricting surface 4a, an arcuate chamfer 4c having a radius of curvature of about 2 mm was formed so that it would have no acute portion to lower the frictional resistance at the contact portion when the reflecting mirror was deformed and thus to suppress scratches and wear. The coating of hardened fluororesin reduces the friction coefficient to less than 0.15.

It was effective to apply a lubricant at the contact portion to reduce the frictional resistance to prevent scratches and wear of the contact surface.

With the thus formed specimen of the variable-curvature mirror for a laser, it was possible to control the curvature of the reflecting surface 1a from flat (in the initial stage when no pressure is applied) to 15 meters (when maximum pressure is applied).

When the shape accuracy of the reflecting mirror 1a was evaluated, a deviation in the shape within the effective area of the reflecting surface (within a diameter of 50 mm) was less than 0.3–0.4 μm over the entire curvature range. It was confirmed that when the curvature was changed, the shape accuracy passable as a reflecting mirror for a laser (that is, deviation of less than 1 μm) was maintained.

With the arrangement of this invention, the peripheral portion of the reflecting mirror is so supported that the translational movement of the mirror is prevented and the pivotal movement of the peripheral portion around the contact point is allowed and the thickness of the mirror is increased toward its center so that the rigidity is large at the center and small at the peripheral portion, to prevent local deformation of the mirror, it is possible to sufficiently increase the shape accuracy of the spherical reflecting mirror over the entire curvature range without encountering such problems as stroke loss of the actuator and an increase in the deforming load.

In the arrangement in which the restricting surface for preventing translational movement of the reflecting mirror has a flatness of less than 1 μm, no drop in the shape accuracy of the reflecting mirror resulting from the accuracy of the restricting surface will occur. The chamfer provided at the inner corner of the restricting surface, hardened resin coating on the restricting surface, and/or lubricant applied to the contact portions of the support member and the reflecting mirror will prevent scratches and wear, thus preventing worsening of the shape accuracy of the reflecting surface due to roughening of the reflecting surface. This improves reliability and stability of curvature control.

What is claimed is:

1. A variable-curvature mirror for a laser comprising a plate-shaped reflecting mirror, a ring-shaped support member for supporting the peripheral portion of said reflecting mirror, and pressurizing means for applying controlled pressure to the back of said reflecting mirror at its central portion to deform said reflecting mirror to form a spherical reflecting surface having a desired curvature, characterized in that said support member has a restricting surface in contact with said reflecting mirror for restricting translation of said reflecting mirror in the direction in which pressure is applied, that said reflecting mirror is supported by said support member with a play to permit pivotal motion of the peripheral portion of said reflecting mirror about a contact point with said support member, and that the thickness of said reflecting mirror radially changes continuously so that in the back thereof, its central portion is thick and the peripheral portion is thinner.

2. The mirror claimed in claim 1 wherein said restricting surface formed on said support member is a flat surface having a flatness of 1 μm or less, the peripheral portion of said reflecting mirror being supported on said restricting surface.

3. The mirror claimed in claim 2 wherein said restricting surface formed on said support member has an arcuate chamfer at inner corner thereof so that said reflecting mirror can pivot about said chamfer.

4. The mirror claimed in claim 1 wherein a hardened film is provided on said restricting surface formed on said support member to reduce the frictional resistance to said reflecting mirror.

5. The mirror claimed in claim 1 wherein a lubricant is applied to contact surfaces between said support member and said reflecting mirror.

* * * * *